United States Patent
Zhao et al.

(10) Patent No.: US 10,769,694 B2
(45) Date of Patent: Sep. 8, 2020

(54) SYSTEMS AND METHODS FOR IDENTIFYING CANDIDATES FOR ITEM SUBSTITUTION

(71) Applicant: Walmart Apollo, LLC, Bentonville, AR (US)

(72) Inventors: Zhao Zhao, Sunnyvale, CA (US); Wei Shen, Danville, CA (US); Chenxi Liu, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 233 days.

(21) Appl. No.: 15/883,902

(22) Filed: Jan. 30, 2018

(65) Prior Publication Data
US 2019/0236674 A1 Aug. 1, 2019

(51) Int. Cl.
*G06Q 30/00* (2012.01)
*G06Q 30/06* (2012.01)
*G06N 3/02* (2006.01)
*G06N 7/00* (2006.01)

(52) U.S. Cl.
CPC .......... *G06Q 30/0623* (2013.01); *G06N 3/02* (2013.01); *G06N 7/005* (2013.01)

(58) Field of Classification Search
CPC ....... G06Q 30/0623; G06N 3/02; G06N 7/005
See application file for complete search history.

(56) References Cited

U.S. PATENT DOCUMENTS

| 6,970,837 | B1 * | 11/2005 | Walker | G06Q 20/10 |
| | | | | 705/14.26 |
| 7,637,426 | B1 * | 12/2009 | Green | G06Q 30/06 |
| | | | | 235/383 |
| 9,202,246 | B1 * | 12/2015 | Bundy | G06Q 30/0635 |
| 10,185,927 | B1 * | 1/2019 | Seyhan | G06Q 10/087 |
| 2002/0062260 | A1 * | 5/2002 | Inoue | G06Q 10/087 |
| | | | | 705/20 |

(Continued)

OTHER PUBLICATIONS

Ajinkya More "Product Matching in eCommerce using deep learning" https://medium.com/walmartlabs/product-matching-in-ecommerce-4f19b6aebaca (Year: 2017).*

*Primary Examiner* — Naeem U Haq
(74) *Attorney, Agent, or Firm* — Bryan Cave Leighton Paisner LLP

(57) ABSTRACT

Systems and methods including one or more processors and one or more non-transitory computer-readable media having computing instructions that are configured to run on the one or more processors and perform acts of receiving a test set comprising potential candidate items for substitution for a target item, determining association scores for each of the potential candidate items in the test set, determining one or more semantic similarity features of the potential candidate items in the test set, determining one or more image similarity features of the potential candidate items in the test set, and creating a substitutive probability model by determining a relative contribution of each of the association scores, the semantic similarity features and the image similarity features to a substitutive probability for the potential candidate items in the test set, with reference to a baseline set of the potential candidate items. Additional embodiments are disclosed herein.

21 Claims, 6 Drawing Sheets

(56) References Cited

U.S. PATENT DOCUMENTS

| | | | |
|---|---|---|---|
| 2002/0133407 A1* | 9/2002 | Walker | G06Q 20/20 705/14.69 |
| 2003/0195883 A1* | 10/2003 | Mojsilovic | G06K 9/00664 |
| 2009/0138365 A1* | 5/2009 | Mueller | G06Q 20/12 705/14.19 |
| 2010/0023340 A1* | 1/2010 | Chowdhary | G06Q 10/06 705/1.1 |
| 2014/0089129 A1* | 3/2014 | Argue | G06Q 30/0631 705/26.7 |
| 2014/0214590 A1* | 7/2014 | Argue | G06Q 30/0631 705/26.7 |

* cited by examiner

400

| 405 – Receiving a test set comprising potential candidate items for substitution for a target item. |

| 410 – Determining association scores for each of the potential candidate items in the test set. |

| 415 – Determining one or more semantic similarity features of the potential candidate items in the test set to the target item in relation to semantic data for the target item and the potential candidate items. |

| 420 – Determining one or more image similarity features of the potential candidate items in the test set to the target item in relation to a similarity of images of the potential candidate items to one or more images of the target item. |

| 425 – Creating a substitutive probability model by determining a relative contribution of each of the association scores, the one or more semantic similarity features and the one or more image similarity features to a substitutive probability for the potential candidate items in the test set. |

| 430 – Determining substitutive probabilities for an evaluation set comprising candidate items for substitution for the target item by using the substitutive probability model. |

FIG. 4

SYSTEMS AND METHODS FOR IDENTIFYING CANDIDATES FOR ITEM SUBSTITUTION

TECHNICAL FIELD

This disclosure relates generally to systems and methods for identifying candidates that are suitable substitutes for an item.

BACKGROUND

The identification of suitable substitutes for items can be desirable in retail settings, for example to provide alternatives when an item is out of stock, or to provide suggestions for persons that have expressed interest in a similar item. However, it can be difficult to identify suitable substitutes without engaging in a lengthy process involving in-depth and manual reviews of potential substitutes by a person capable of visually or otherwise manually ascertaining similarities between different items. Such a lengthy process might not provide a quick enough turn-around to notify persons in time for ordering, particularly when an automatic replenishment order is being filled, or to notify a person in time when a price drop or other event has occurred in a similar item that might be of interest to the person.

BRIEF DESCRIPTION OF THE DRAWINGS

To facilitate further description of the embodiments, the following drawings are provided in which:

FIG. 4 is a flowchart for a method, according to certain embodiments;

Figure 1:
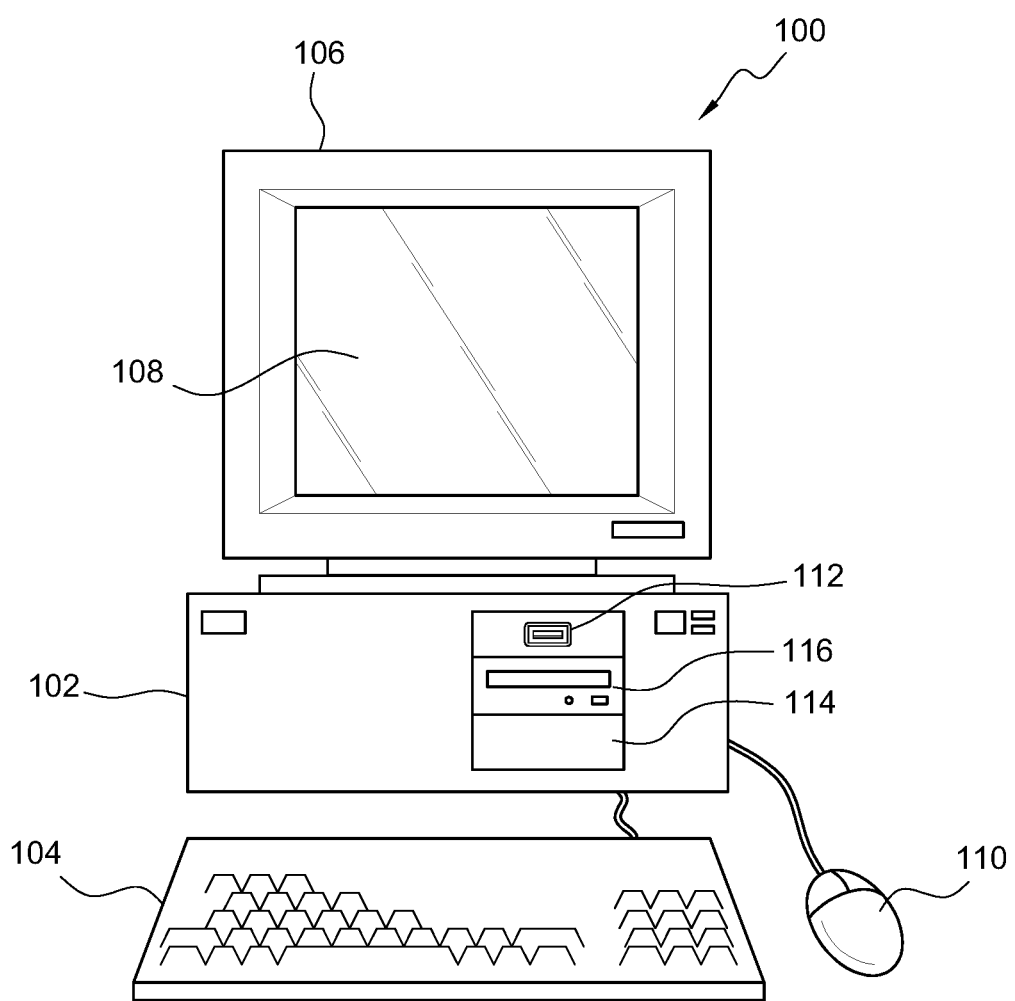
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors, and one or more non-transitory computer-readable media storing computing instructions configured to run on the one or more processors. The one or more non-transitory computer-readable media can be configured to run on the one or more processors and perform an act of receiving a test set comprising potential candidate items for substitution for a target item. The one or more non-transitory computer-readable media also can be configured to run on the one or more processors and perform an act of determining association scores for each of the potential candidate items in the test set, the association scores including: (i) a viewed-also-viewed association score for each of the potential candidate items in the test set that is determined in relation to a total number of browsing sessions in which the target item and one or more candidate items were both viewed by a same viewer during a same browsing session; (ii) a selected-also-selected association score for each of the potential candidate items in the test set that is determined in relation to a total number of browsing sessions in which the target item and the potential candidate items were both selected by a same viewer during a same browsing session; and (iii) a viewed-ultimately-selected association score for each of the potential candidate items in the test set that is determined in relation to a total number of browsing sessions in which the target item was viewed and the potential candidate items were selected by a same viewer during a same browsing session. The one or more non-transitory computer-readable media also can be configured to run on the one or more processors and perform an act of determining one or more semantic similarity features of the potential candidate items in the test set to the target item in relation to semantic data for the target item and the potential candidate items. The one or more non-transitory computer-readable media also can be configured to run on the one or more processors and perform an act of determining one or more image similarity features of the potential candidate items in the test set to the target item in relation to a similarity of images of the potential candidate items to one or more images of the target item. The one or more non-transitory computer-readable media further can be configured to run on the one or more processors and perform an act of creating a substitutive probability model by determining a relative contribution of each of the association scores, the one or more semantic similarity features and the one or more image similarity features to a substitutive probability for the potential candidate items in the test set, with reference to a baseline set of the potential candidate items. The one or more non-transitory computer-readable media additionally can be configured to run on the one or more processors and perform an act of determining substitutive probabilities for an evaluation set comprising candidate items for substitution for the target item by using the substitutive probability model, wherein the candidate items include at least one of the potential candidate items.

Various embodiments include a method. The method can be implemented via execution of computing instructions configured to run at one or more processors and configured to be stored at non-transitory computer-readable media. The method can include receiving a test set comprising potential candidate items for substitution for a target item. The method can also include determining association scores for each of the potential candidate items in the test set, the association scores comprising: (i) a viewed-also-viewed association score for each of the potential candidate items in the test set that is determined in relation to a total number of browsing sessions in which the target item and one or more candidate items were both viewed by a same viewer during a same browsing session; (ii) a selected-also-selected association score for each of the potential candidate items in the test set that is determined in relation to a total number of browsing sessions in which the target item and the potential candidate items were both selected by a same viewer during a same browsing session; and (iii) a viewed-ultimately-selected association score for each of the potential candidate items in the test set that is determined in relation to a total number of browsing sessions in which the target item was viewed and the potential candidate items were selected by a same viewer during a same browsing session. The method also can include determining one or more semantic similarity features of the potential candidate items in the test set to the target item in relation to semantic data for the target item and the potential candidate items. The method also can include determining one or more image similarity features of the potential candidate items in the test set to the target item in relation to a similarity of images of the potential candidate items to one or more images of the target item. The method additionally can include creating a substitutive probability model by determining a relative contribution of each of the association scores, the one or more semantic similarity features and the one or more image similarity features to a substitutive probability for the potential candidate items in the test set, with reference to a baseline set of the potential candidate items. The method can further include determining substitutive probabilities for an evaluation set comprising candidate items for substitution for the target item by using the substitutive probability model, wherein the candidate items comprise at least one of the potential candidate items.

Various embodiments include a method. The method can be implemented via execution of computing instructions configured to run at one or more processors and configured to be stored at non-transitory computer-readable media. The method can include receiving an evaluation set of potential candidate items for substitution for the target item, the evaluation set including one or more of potential candidate items in a test set and potential candidate items that were not in the test set. The method also can include, for any potential candidate items in the evaluation set that were not in the test set, determining association scores for each of the potential candidate items. The method can further include determining association scores including: (i) a viewed-also-viewed association score for each of the potential candidate items that is determined in relation to a total number of browsing sessions in which the target item and the potential candidate items were both viewed by a same viewer during a same browsing session; (ii) a selected-also-selected association score for each of the potential candidate items that is determined in relation to a total number of browsing sessions in which the target item and the potential candidate items were both selected by a same viewer during a same browsing session; and (iii) a viewed-ultimately-selected association score for each of the potential candidate items that is determined in relation to a total number of browsing sessions in which the target item was viewed and the potential candidate items were selected by a same viewer during a same browsing session. The method also can include determining one or more semantic similarity features of the potential candidate items to the target item in relation to semantic data for the target item and the potential candidate items. The method can further include determining one or more image similarity features of the potential candidate items to the target item in relation to a similarity of images of the potential candidate items to one or more images of the target item. The method can additionally include applying a substitutive probability model created using the test set of potential candidate items to evaluate the substitutive probabilities for one or more potential candidates of the evaluation set, using the association scores, the one or more semantic similarity features and the one or more image similarity features determined for the one or more potential candidate items in the evaluation set.

The identification of substitutes within a product catalog plays a role in a wide variety of applications, such as online shopping. For example, an automatic replenishment service can be used to find the best replacement for products that a customer usually buys, but are out of stock at the moment of reordering. Also, when products have price drops, it can be desirable for a marketing application to send out the price drop alerts not only to customers who have viewed the same products, but also customers who viewed similar products.

One metric for determining similarities can be 'viewed-also-viewed' (VAV) data, which indicates which products were also viewed with a product in a same browsing session. An assumption with the use of VAV data is that when a customer browses online, they tend to browse and compare similar products before finally making the decision on which product to buy.

However, relying on VAV data as the sole metric for product substitutes can have certain limitations. For example, VAV data can contain not only substitutive products, but also complementary products. For example, when a customer browses different types of guitars online, he/she can also browse guitar picks, bags, and stands during the same browsing session. Accordingly, it can be that quite often these complementary products can even enter the top list of viewed items. Furthermore, the approach of relying on VAV data can break down if the item for which a substitute is sought is relatively new and/or does not have a lot of viewing data associated therewith.

Thus, according to one aspect, to address the possibility of noise involved in VAV data, the possibility to combine other product association data therewith is considered. For example, 'bought-also-bought' (BAB), and 'viewed-ultimately-bought' (VUB) data can be considered. It was discovered that BAB data tends to be heavily concentrated on complementary items, as customers rarely buy multiple similar products with different brand during the same transaction. Intuitively, if the signal of BAB is subtracted from VAV, a much cleaner product substitute signal can be obtained. On the other hand, according to one aspect, to address the 'cold-start' problem for relatively new items, semantic and image similarity signals can be included. Sematic similarities can look at, for example, sematic features such as product title/brand/type/description etc., and determine how close two products are related to each other. Image similarity can, for example, rely on deep learning technologies to train a convolutional neural network to determine how similar images of two products are. Finally, according to one aspect, all of these features/signals, including customer behavior signals VAV, VUB, BAB associations, and product information signals such as semantic similarities and image similarities can be combined together to train a final product substitute model.

Accordingly, in one aspect a two-stage machine learning model is proposed for identifying product substitutes. For example, according to one aspect, during the first level, VAV, VUB, BAB can be collected, as well as semantic similarity and image similarity features. Some of these can be directly calculated, and some can be output of machine learning models. During the second level, according to one aspect, all of these features can be combined together to train the ultimate product substitute model.

Aspects of the two-state machine learning model for identifying product substitutes provide numerous advantages. A first advantage is that aspects of the model overcome limitations of relying on VAV data as the ground truth of product substitutes, unlike previous research (e.g., McAuley, Pandey, Leskovec 2015). A second advantage is that aspects combine the capability of deep learning technologies in identity image similarity with a traditional machine learning model to generate a two-stage machine learning model. Overall, evaluation results show 20% improvement in product substitutes accuracy compared to the use of VAV alone.

Figure 6:
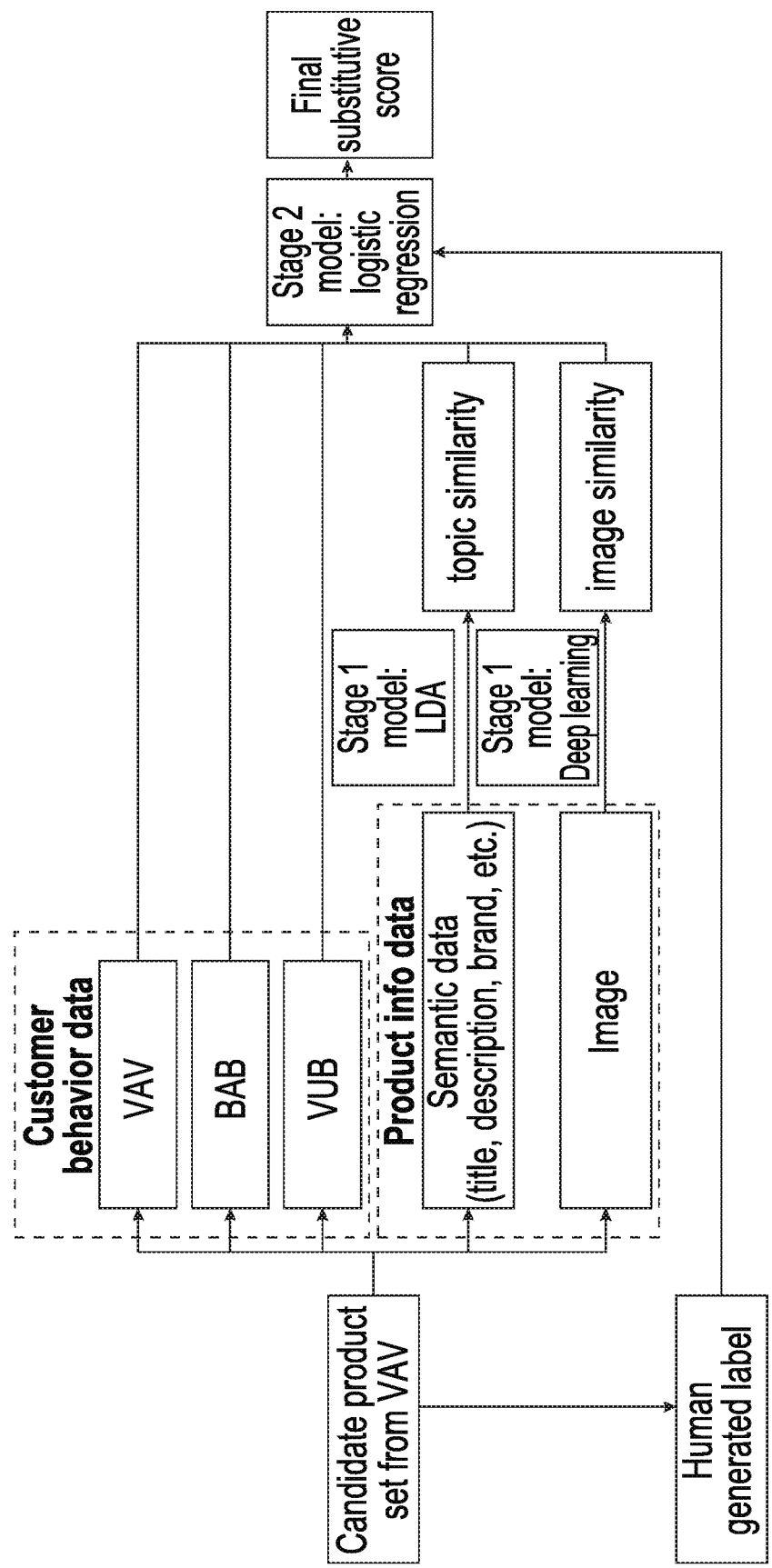
FIG. 6 illustrates a representative block diagram of an example of a two-stage model for determining substitutive probability, according to one embodiment.

According to one aspect, an overall methodology framework for a two-stage model can be illustrated as in FIG. 6. In the embodiment as shown in FIG. 6, a candidate product set based on VAV is introduced into the first stage of a two-stage model, customer behavior data corresponding to VAV, BAB and VUB is used to generate association scores, product info data is generated using semantic data and image data. Semantic data is evaluated with a Latent Dirichlet Allocation (LDA) model to provide topic similarity information, and image data is evaluated with a deep learning model to provide image similarity information. The association scores, topical similarity information and image similarity information is provided in stage two and a logistic regression is performed, using comparison to candidates selected by a human generated label, to provide a final substitutive score for the products.

According to one aspect, a sparse candidate product set is generated for each product. Generally, an entire product catalog will have M items. Accordingly, for each item i, it can be possible to compute the 'substitutive score' for each of the rest M−1 items. This will result in output data of a full M*M matrix. However, the computation and storage cost of such a large matrix is extremely high and usually not applicable for large-scale companies. Accordingly, in one aspect, for each product, only a limited number of candidate products are scored. These candidate products can be pre-selected using rough criteria such as the top N 'view-also-viewed' items combined with all the items belonging to the same sub category. For example, if on average ~N' (N'<<M) candidate products are identified for each product, then scores for only M*N' entries can be generated.

According to one aspect, a training data set is generated for comparison in stage 2. Accordingly, for each product in the training set, a true set of substitutive products is identified. Because completely relying on VAV data for such a set is not the best approach, another method is provided in order to label products as substituted or no. Accordingly, in one embodiment, all of the images/product titles for products can be provided to human participants, such as QA engineers, and they can select a subset of the products that they believe are the true substitutes for the products. To speed up the labeling process, in one embodiment a web-based UI can be used to help the participants identify and label the true substitutes. In one embodiment, by default, all the candidate products are checked as true substitutes. The participant can uncheck any products that are not good substitutes and record the data by clicking an 'update' button.

Furthermore, according to one aspect, for each candidate product, we calculate their VAV/BAB/VUB association scores based on conditional probability.

Given a product i, the VAV association score for any of its candidate product j is the conditional probability that, given that product i has been viewed, how likely is it that product j has also been viewed. Mathematically, $P(VAV)\_ij$=number of sessions that product i and product j have been viewed together/number of sessions that product i have been viewed.

Similarly, given a product i, the BAB association score for any of its candidate product j is the conditional probability that, given that product i has been bought, how likely is it that product j has also been bought. Mathematically, P(BAB)_ij=number of orders that product i and product j have been purchased together/number of orders that product i have been bought.

Finally, given a product i, the VUB association score for any of its candidate product j is the conditional probability that, given that product i has been viewed and some products were bought during the same session, how likely is it that product j has been bought. Mathematically, P(VUB)_{ij}=number of sessions with purchase that product j have been purchased and product i have been viewed/number of sessions with purchase that product i have been viewed.

According to one aspect, each product, even the ones which are newly added to the product catalog, often carry a lot of semantic data, such as product title, taxonomy (i.e., categories that the product belongs to), description, etc. These semantic data are usually unstructured and their lengths can vary significantly from one product to another. How to use a limited number of features to capture the information carried by these semantic data can be major task.

In one embodiment, a topic model can be used for this task. According to one aspect, a limited number of 'topics' are discovered from semantic data of all the products, say 1, 2, . . . , N. Each product i can then be represented by a topic vector [s_{i1}, s_{i2}, . . . , s_{iN}] representing how closely the product i is related to each of these topics. An example of a topic model that can be utilized is called Latent Dirichlet Allocation, which is an unsupervised learning approach and can uncover latent structure.

According to one embodiment, by feeding all the semantic data of products to the LDA model, it is possible to generate a finite number of numerical features for each product. These features can be become part of the input features for stage 2 of the model.

Furthermore, apart from semantic similarity, how similar two products are in terms of their image also can be a strong indicator that the two products could be good substitutes for one another. Accordingly, in one aspect, to derive the image similarity between products, deep learning technology is used. Recently, the area of deep learning using convolutional neural networks (CNNs) has made incredible strides in recognizing objects across a variety of viewpoints and distortions. Accordingly, in one aspect, a method can be built method around this powerful tool to learn functions that can reason about object similarity across wide baselines and wide changes in appearance. In one embodiment, for each candidate product pair, we apply images of the products to a Siamese CNN to provide high quality embeddings (i.e., low dimension representation). These embeddings can then become part of the input features for stage 2 of the model.

According to one aspect, at stage 2 of the model, all the numerical features computed or predicted during stage 1 are fed into a classification framework to train for the final model. In logistic regression, the probability of classifying product j as product i's substitute can be represented by a sigmoid function as follows:

$$P_{ij} = \frac{1}{1 + e^{-(\beta_0 + \sum_{k=1}^{n} \beta_k x_{ijk})}}$$

where
$P_{ij}$ is the final substitutive probability;
$x_{ijk}$'s are the numerical features computed in stage 1 (e.g., including VAV, BAB, VUB association scores, semantic similarity features, and image similarity features);
$\beta_k$'s are weights of features and are calibrated based on training data;
$B_o$ is a constant scaling factor;
k is the index for the numerical features computed in stage 1 (e.g., including VAV, BAB, VUB association scores, semantic similarity features, and image similarity features); and
n is the total number of numerical features computed in stage 1.

According to one aspect, once the two-stage model is calibrated based on training data, the same model can be applied to a brand new test data set for purposes of evaluation. The performance of the two-stage model also was compared to a baseline model solely based on VAV association scores. The AUC (area under curve) is improved by 20% using the two stage model over the VAV baseline model. In particular, according to one aspect, the two-stage model can be very efficient in excluding complementary items from the final set of substitute products.

Further discussion of aspects of the model, as well as embodiments of systems and methods that can incorporate the model or at least a portion thereof, are described below.

Figure 2:
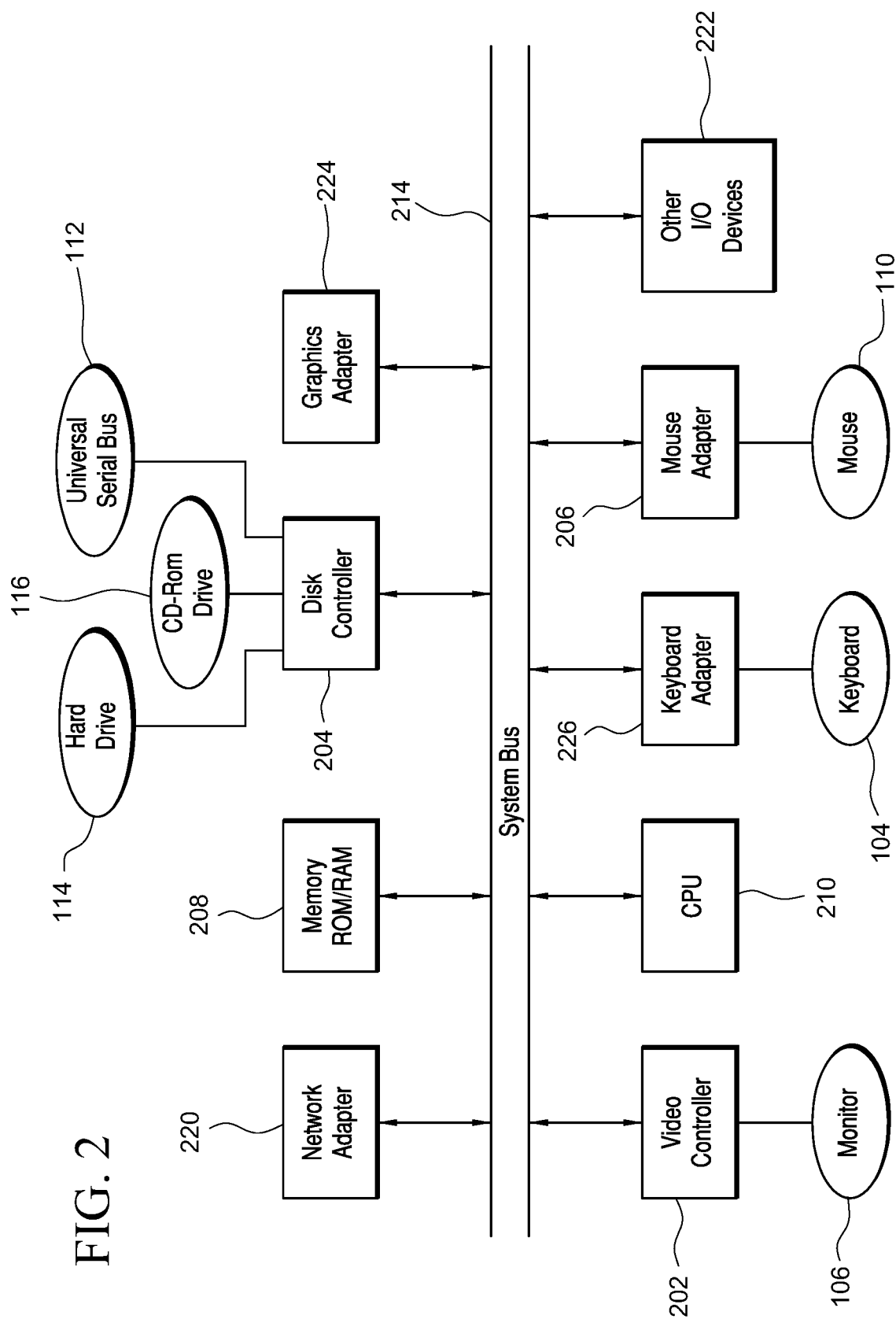
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
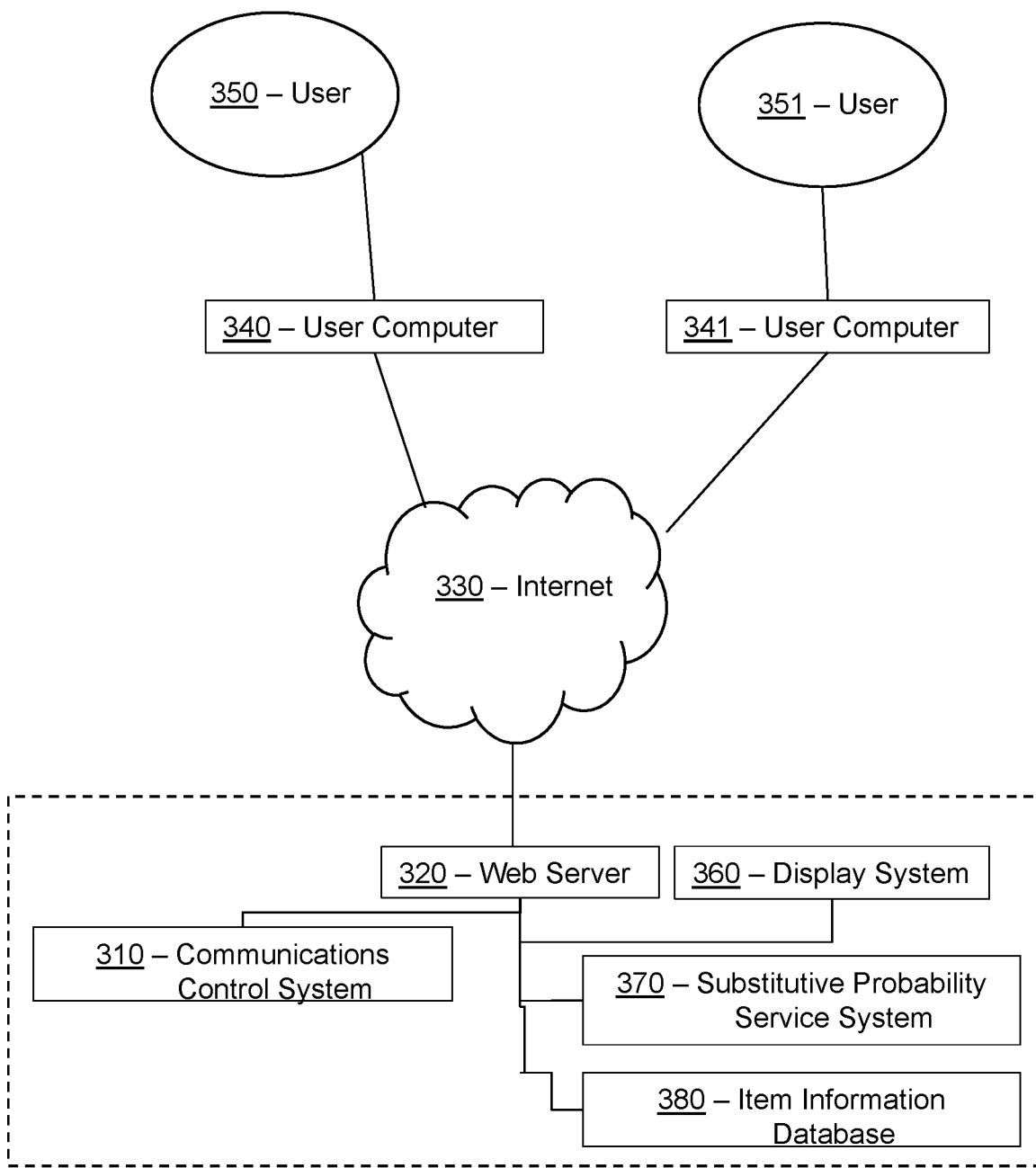
FIG. 3 illustrates a representative block diagram of a system, according to an embodiment.

Turning ahead in the drawings, FIG. 3 illustrates a block diagram of a system 300 that can be employed for identifying candidate items for substitution, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communications control system 310, a web server 320 (or front end server), a display system 360, a substitutive probability service system 370, and/or an item information database 380. Communications control system 310, web server 320, display system 360, substitutive probability service system 370, and/or item information database 380 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communications control system 310, web server 320, display system 360, substitutive probability service system 370, and/or item information database 380. Additional details regarding communications control system 310, web server 320, display system 360, substitutive probability service system 370, and/or item information database 380 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites and/or can provide services as an email server. For example, web server 320 can host a website that allows users to browse and/or search for products, to add products to an electronic shopping cart, and/or to purchase products, in addition to other suitable activities. Web server also can serve as an email server to send and receive email messages via the internet 330 to user computers (e.g., 340, 341).

In many embodiments, communication control system 310, web server 320, display system 360, substitute probability service system 370 and/or item information database 380 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communications control system 310, web server 320, display system 360, substitutive probability service system 370 and/or item information database 380 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communications control system 310, web server 320, display system 360, substitutive probability service system 370, and/or item information database 380. In a similar manner, the processing module(s) and the memory storage module(s) can be local and/or remote to each other.

In many embodiments, communications system 310, web server 320, display system 360, substitutive probability service system 370, and/or item information database 380 can be configured to communicate with one or more user computers 340 and 341. In some embodiments, user computers 340 and 341 also can be referred to as customer computers. In some embodiments, communications system 310, web server 320, display system 360, substitutive probability service system 370, and/or item information database 380 can communicate or interface (e.g., interact) with one or more customer computers (such as user computers 340 and 341) through a network or internet 330. Internet 330 can be an intranet that is not open to the public. Accordingly, in many embodiments, communications system 310, web server 320, display system 360, substitutive probability service system 370 and/or item information database 380 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communications system 310, web server 320, display system 360, substitutive probability service system 370, and/or key value database 380 also can be configured to communicate with one or more databases or electronic file management systems. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases or electronic file management systems can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communications control system 310, web server 320, display system 360, substitutive probability service system 370 and/or item information database 380 and/or the one or more databases or electronic file management systems can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
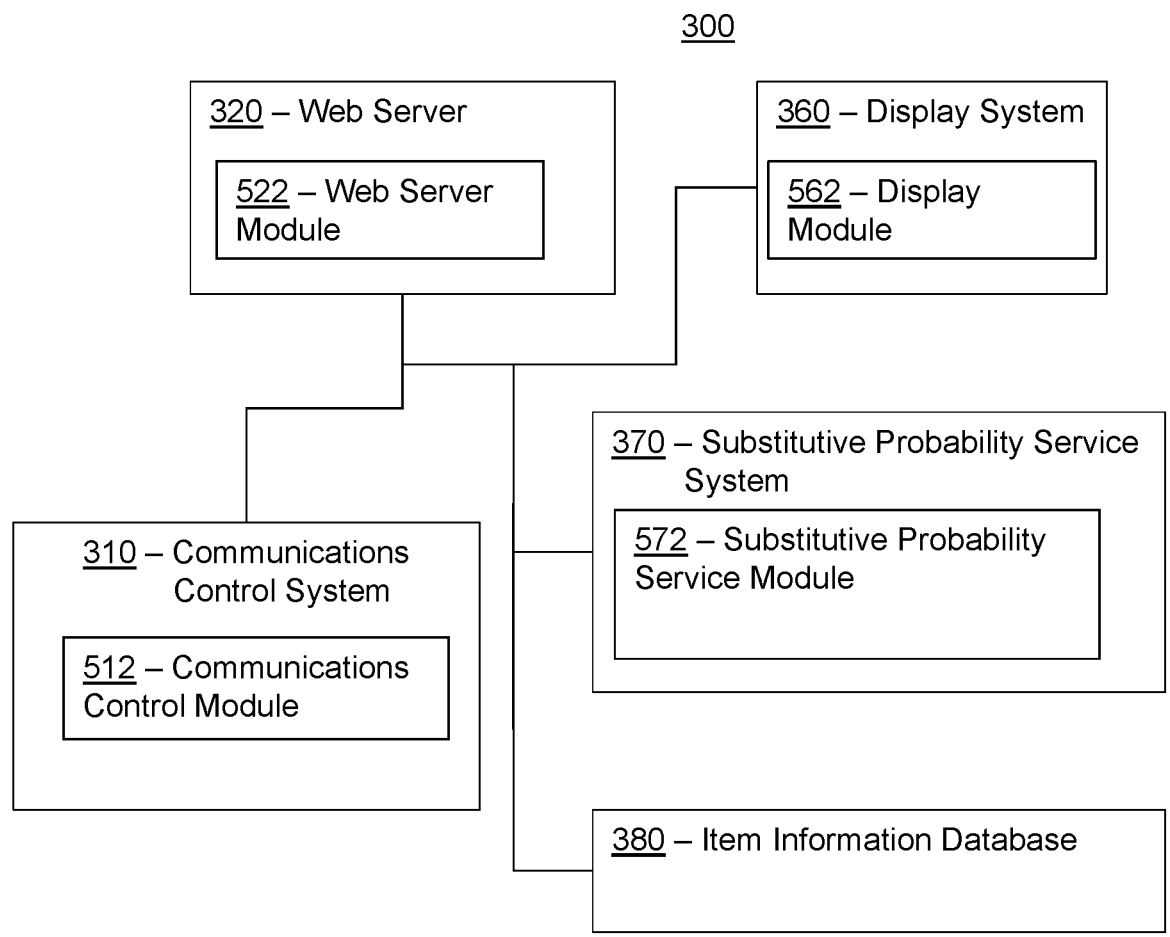
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, and/or 572 (FIG. 5). Such non-transitory memory storage modules can be part of a computer system such as communications control system 310, web server 320, display system 360, substitutive probability service system 370 and/or item information database 380 (FIGS. 3 & 5). The processing module(s) can be similar or identical to the processing module(s) described above with respect to computer system 100 (FIG. 1).

In many embodiments, method 400 can comprise an activity 405 of receiving a test set comprising potential candidate items for substitute for a target item. In some embodiments, activity 405 can comprise receiving, at a first processor, such as but not limited to substitutive probability service system 370 (FIG. 3), a test set of candidate items from item information database 380. The target items and potential candidate items can be, for example, commercial products for sale, or other items. The item information database 380 can comprise information on items such as viewing information for each item, purchase information data for each item, item descriptions, item categories, and other item information. For example, the item information database 380 can comprise catalog information listing all available items, as well as information associated with such as items.

In one embodiment, activity 405 can comprise receiving potential candidate items that are identified as one or more of: (i) one or more potential candidate items that have been viewed during a same browsing session as the target item by a same viewer, for a minimum number of browsing sessions, and (ii) one or more of the potential candidate items belonging to a same category as the target item. In some embodiments, the activity 405 can comprise receiving at a first processor, such as but not limited to substitutive probability system 370 (FIG. 3), one or more candidate items that have been viewed during a same browsing session as the target item by a same viewer, also referred to as viewed-also-viewed data (VAV) from the item information database 380, and the first processor can determine whether the VAV data is for a minimum number of browsing sessions. In some embodiments, the activity 405 can comprise receiving at a first processor, such as but not limited to substitutive probability system 370 (FIG. 3), a listing of one or more items that below to a same category as the target item, from the item information database 380.

In many embodiments, method 400 can comprise an activity 410 of determining association scores for each of the potential candidate items in the test set. In some embodiments, activity 410 can comprise receiving, at a first processor, such as but not limited to substitutive probability service system 370 (FIG. 3), information from the item information database 380 (FIG. 3) for determining the association scores.

In various embodiments the association scores comprise a viewed-also-viewed association score for each of the potential candidate items in the test set that is determined in relation to a total number of browsing sessions in which the target item and the one or more candidate items were both viewed by a same viewer during a same browsing session. For example, the substitutive probability service system 370 (FIG. 3) can receive information from the item information database 380 that relates to whether items were viewed together by a viewer in a same browsing session, and how many browsing sessions overall included such viewing activity.

In other embodiments, the association scores comprise selected-also-selected association score for each of the potential candidate items in the test set that is determined in relation to a total number of browsing sessions in which the target item and potential candidate items were both selected by a same viewer during a same browsing session. For example, the substitutive probability service system 370 (FIG. 3) can receive information from the item information database 380 that relates to whether items were selected together by a viewer together in a same browsing session, and how many browsing sessions overall included such selecting activity.

In other embodiments, the association scores comprise a viewed-ultimately-selected association score for each of the potential candidate items in the test set that is determined in relation to a total number of browsing sessions in which the target item was viewed and the potential candidate items were selected by a same viewer during a same browsing session. For example, the substitutive probability service system 370 (FIG. 3) can receive information from the item information database 380 that relates to whether items were viewed and selected together by a viewer in a same browsing session, and how many browsing sessions overall included such selecting activity. A selection can include, for example, a purchase of the item by the viewer, or some other selecting activity. For example, selected-also-selected (SAS) associations can be bought-also-bought (BAB) associations, and viewed-ultimately-selected (VUS) associations can be viewed-ultimately-bought (VUB) associations. Also, in certain embodiments, the viewers can correspond to one or more of the users 350, 361 (FIG. 3)

In one embodiment, the activity 410 comprises determining the viewed-also-viewed association score by evaluating a formula:

P(VAV)_ij=(total number of browsing sessions in which item i and item j are both viewed)/(total number of browsing sessions in which item i is viewed and item j is not viewed), where item i represents the target item and item j represents the potential candidate item. The formula can be evaluated by a first processor such as but not limited to the substitutive probability service system 370 (FIG. 3).

In another embodiment, the activity 410 comprises determining the selected-also-selected association score by evaluating a formula:

P(SAS)_ij=(total number of browsing sessions in which item i and item j are both selected)/(total number of browsing sessions in which item i is selected and item j is not selected), where item i represents the target item and item j represents the potential candidate item. The formula can be evaluated by a first processor such as but not limited to the substitutive probability service system 370 (FIG. 3).

In yet another embodiment, the activity 410 comprises determining the viewed-ultimately-selected association score by evaluating a formula:

P(VUS)_ij=(total number of browsing sessions in which item j is selected and item i is viewed)/(total number of browsing sessions in which an item is selected and item i is viewed), where item i represents the target item and item j represents the potential candidate item. The formula can be evaluated by a first processor such as but not limited to the substitutive probability service system 370 (FIG. 3).

In many embodiments, method 400 can comprise an activity 415 of determining one or more semantic similarity features of the potential candidate items in the test set to the target item in relation to semantic data for the target item and the potential candidate items. In some embodiments, activity 415 can comprise receiving, at a first processor, such as but not limited to substitutive probability service system 370 (FIG. 3), semantic information from the item information database 380 (FIG. 3) including semantic information relating to one of more of the target item and the potential candidate items. The semantic information can include, for example, one or more of item name information, item description information, item label information, item review information and/or metadata associated with the item. For example, in some embodiments determining the one or more semantic similarity features of the potential candidate items in the test set to the target item comprises determining at least one semantic similarity feature in relation to semantic data for the target item and at least one of the potential candidate items that includes at least one of an item title, an item description, and one or more item categories, where the item title, item description and/or item categories can be received from the item information database 380. In one embodiment, determining the one or more semantic similarity features of the potential candidate items in the test set to the target item comprises evaluating semantic similarity according to a Latent Dirichlet Allocation (LDA) topic model. Other models for discovering relations in semantic data also can be used, including machine learning models and models for uncovering structure in semantic data.

In many embodiments, method 400 can comprise an activity 420 of determining one or more image similarity features of the potential candidate items in the test set to the target item in relation to a similarity of images of the potential candidate items to one or more images of the target item. In some embodiments, activity 420 can comprise receiving, at a first processor, such as but not limited to substitutive probability service system 370 (FIG. 3), image information from the item information database 380 (FIG. 3) including image information relating to one of more of the target item and the potential candidate items. For example, the image information can include one or more images of the candidates, for example at different angles, in different lighting and/or environments, etc. In some embodiments, the activity 420 comprises determining the one or more image similarity features of the potential candidate items in the test set of the target item in relation to the similarity of images of one or more candidate items to one or more images of the target item by evaluating image similarity using a convolutional neural network (CNN). Other machine learning or analysis models also can be used.

In many embodiments, method 400 can comprise an activity 425 of creating a substitutive probability model by determining a relative contribution of each of the association scores, the one or more semantic similarity features and the one or more image similarity features to a substitutive probability for the potential candidate items in the test set, with reference to a baseline set of the potential candidate items. In some embodiments, activity 425 can comprise receiving, at a first processor, such as but not limited to substitutive probability service system 370 (FIG. 3), a baseline set of the potential candidate items from the item information database 380 (FIG. 3), such as for example a baseline set of one or more potential candidate items that are manually identified as being suitable substitute for the target item by a human operator. Embodiments of the activity 425 can further comprise, at the first processor, such as but not limited to the substitutive probability service system 370 (FIG. 3) performing calculations to determine the relative contributions of each of the association scores, semantic similarity features and image similarity features, to create the substitutive probability model.

In some embodiments, the activity 425 can comprise creating the substitutive probability model by determining the relative contribution of each of the association scores, the one or more semantic similarity features and the one or more image similarity features to the substitutive probability for the potential candidate items in the test set, with reference to the baseline set of the potential candidate items, by performing a logistic regression to determine substitutive probability $P_{ij}$ represented by the following formula:

$$P_{ij} = \frac{1}{1 + e^{-(\beta_0 + \sum_{k=1}^{n} \beta_k x_{ijk})}}$$

where the $x_{ijk}$'s each represent the viewed-also-viewed association score, the selected-also-selected score, the viewed-ultimately-selected score, the one or more semantic similarity features, and the one or more image similarity features;

the $\beta_k$'s each represent respective contributions of the viewed-also-viewed association score, the selected-also-selected score, the viewed-ultimately-selected score, the one or more semantic similarity features, and the one or more image similarity features, as determined via logistic regression with reference to the baseline set of the potential candidate items;

$B_o$ is a constant scaling factor;

k is an index for each of the viewed-also-viewed association score, the selected-also-selected score, the viewedultimately-selected score, the one or more semantic similarity features, and the one or more image similarity features, and n is the total number of the viewed-also-viewed association score, the selected-also-selected score, the viewed-ultimately-selected score, the one or more semantic similarity features, and the one or more image similarity features.

In one embodiment, the logistic regression to determine the substitutive probability $P_{ij}$ is performed by a first processor, such as but not limited to the substitutive probability service system 370.

In many embodiments, method 400 can comprise an activity 430 of determining substitutive probabilities for an evaluation set comprising candidate items for substitution for the target item by using the substitutive probability model, wherein the candidate items comprise at least one of the potential candidate items. In some embodiments, activity 430 can comprise receiving, at a first processor, such as but not limited to substitutive probability service system 370 (FIG. 3), an evaluation set comprising candidate items for substitution for the target item from the information database 380 (FIG. 3), such as for example a set of items in a product catalog, which could possibly be substituted for the target item. In one embodiment the evaluation set comprises a more comprehensive and/or larger set of potential candidate items than the test set, such as for example all items corresponding to an entire product catalog. In further embodiments, activity 430 can comprise, at the first processor, such as but not limited to the substitutive probability service system 370 (FIG. 3) performing calculations to determine the substitutive probabilities for the evaluation set. In yet another embodiment, the substitutive probabilities generated at the substitutive probability service system 370 can be provided to the communications control system 310 (FIG. 3), for example to include in a message or display to a user 350, 350. For example, the communications control system 310 can comprise a processor that receives the substitutive probability information from the substitutive probability service, and uses the information to make a suggestion to a user 350, 351 via email message or the communication sent by the web server 320 via the internet 330 (FIG. 3). In yet another example, the communications control system 310 can comprise a processor that receives the substitutive probability information from the substitutive probability service system 370, and uses the information to make a suggestion to a user 350, 351 via a display of a web page providing the information that is hosted by the web server 320, such as in cooperation with the display system 360 (FIG. 3). The substitute items can be suggested and/or presented to the user, for example, when the substitutive probability for the substitute item exceeds a minimum threshold, and/or a plurality of such substitute items can be suggested a user, such as via an email communication or web page display. For example, the suggestion of a substitute item can be made to the user when the user views or selects, or otherwise indicates interest in, an item for which a high substitutive probability exists for the substitute item. In yet another example, the suggestion of the substitute item can be made when an item is out of stock, or when there is a price drop or other activity related to the substitute item.

In some embodiments, the activity 430 comprises determining substitutive probabilities for one or more candidates of an evaluation set of potential candidate items for substitution for the target item, using the substitutive probability model created using the test set of potential candidate items, by receiving the evaluation set of potential candidate items for substitution for the target item, the evaluation set comprising one or more of potential candidate items in the test set and potential candidate items that were not in the test set, and then performing activities 410, 415, 420 for any potential candidate items in the evaluation set that were not in the test set. That is in certain embodiments, one or more of the association scores, semantic similarity features, and image similarity features, can be calculated for potential candidate items that were not in the test set (e.g., those for which the association scores and semantic/image similarity features were not previously calculated), such that the scores and/or similarity features can be used in the substitutive probability model created using the test set.

That is, for potential candidate items in the evaluation set that were not in the test set, embodiments of the method 400 comprise determining association scores for each of the potential candidate items, as in activity 410, the association scores comprising: (i) a viewed-also-viewed association score for each of the potential candidate items that is determined in relation to a total number of browsing sessions in which the target item and the potential candidate items were both viewed by a same viewer during a same browsing session; (ii) a selected-also-selected association score for each of the potential candidate items that is determined in relation to a total number of browsing sessions in which the target item and the potential candidate items were both selected by a same viewer during a same browsing session; and (iii) a viewed-ultimately-selected association score for each of the potential candidate items that is determined in relation to a total number of browsing sessions in which the target item was viewed and the potential candidate items were selected by a same viewer during a same browsing session. Furthermore, for potential candidate items in the evaluation set that were not in the test set, embodiments of the method 400 comprise determining one or more semantic similarity features of the potential candidate items to the target item in relation to semantic data for the target item and the potential candidate items, as in activity 415. Also, for potential candidate items in the evaluation set that were not in the test set, embodiments of the method 400 comprise determining one or more image similarity features of the potential candidate items to the target item in relation to a similarity of images of the potential candidate items to one or more images of the target item, as in activity 420. Once the association scores, semantic similarity features and/or image similarity features are determined for any potential candidates that were not in the test set (e.g., for which the scores and similarities had not yet been calculated, the method 400 further comprises, in activity 430, applying the substitutive probability model created using the test set of potential candidate items to evaluate the substitutive probabilities for one or more potential candidates of the evaluation set, using the association scores, the one or more semantic similarity features and the one or more image similarity features determined for potential candidate items in the evaluation set.

In yet another embodiment, one or more of the substitutive probability model created by performing activity 425 using the test set, and/or one or more of the relative contributions of one or more of the association scores, one or more semantic similarity features, and one or more image similarity features determined by performing activity 425 using the test set can be stored for later use, for example in evaluating the potential candidates in an evaluation set that includes potential candidates that were not among the candidates of the test set. For example, the substitutive probability service system 370 can provide one or more of the substitutive probability model and/or relative contributions obtained in performing activity 425, to the item information database 380, for storage therein. In one embodiment, in a case where a new evaluation set of potential candidates is to be evaluated, the substitutive probability model and/or one or more of the relative contributions determined for the test set can be retrieved by the substitutive probability system 370 from the item information database 380 to determine the substitutive probabilities of potential candidates in the evaluation set.

FIG. 5 illustrates a block diagram of a portion of system 300 comprising communications control service system 310, web server 320, display system 360, substitutive probability service system 370, and/or item information database 380, according to the embodiment shown in FIG. 3. Each of communications control system 310, web server 320, display system 360, substitutive probability service system 370, and item information database 380 in FIG. 5 is merely exemplary and not limited to the embodiments presented herein. Each of communications control system 310, web server 320, display system 360, substitutive probability service system 370, and/or item information database 380, can be employed in many different embodiments or examples not specifically depicted or described herein. In some embodiments, certain elements or modules of communications control system 310, web server 320, display system 360, substitutive probability service system 370, and/or item information database 380 can perform various procedures, processes, and/or acts. In other embodiments, the procedures, processes, and/or acts can be performed by other suitable elements or modules.

In many embodiments, communications control system 310 can comprise non-transitory memory storage module 512. Memory storage module 512 can be referred to as communications control module 512. In many embodiments, communications control module 512 can store computing instructions configured to run on one or more processing modules and perform one or more acts of method 400 (FIG. 4). For example, in some embodiments, the communications control module creates communications such as email messages, or works with display system 360 (FIG. 3), to provide information to users 350, 351 regarding item substitutes, in response to the substitutive probabilities determined for items by the substitutive probability service system 370. In many embodiments, web server 320 can comprise non-transitory memory storage module 522. Memory storage module 522 can be referred to as web server module 522. In many embodiments, web server module 522 can store computing instructions configured to run on one or more processing modules and perform one or more acts of method 400 (FIG. 4) (e.g., activity 405 of receiving a test set of potential candidate items for substitution for a target item (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4). In some embodiments, the display module 562 operates in conjunction with the communications control system 310 (FIG. 3) to communication information regarding substitute items to a user 350, 351, for example via a web page hosted by the web server 320 and broadcast to the user 350, 351 via the interne 330.

In many embodiments, configuration service system 370 can comprise non-transitory memory storage module 572. Memory storage module 572 can be referred to as substitutive probability service module 572. In many embodiments, substitutive probability service module 572 can store computing instructions configured to run on one or more processing modules and perform one or more acts of method 400 (FIG. 4) (e.g. an activity 405 of receiving a test set comprising potential candidate items for substitution for a target item (FIG. 4), an activity 410 of determining association scores for each of the potential candidate items in the test set (FIG. 4), an activity 415 of determining one or more semantic similarity features of the potential candidate items in the test set to the target item in relation to semantic data for the target item and the potential candidate items (FIG. 4), an activity 420 of determining one or more image similarity features of the potential candidate items in the test set to the target item in relation to a similarity of images of the potential candidate items to one or more images of the target item (FIG. 4), an activity 425 of creating a substitutive probability model by determining a relative contribution of each of the association scores, the one or more semantic similarity features and the one or more image similarity features to a substitutive probability for the potential candidate items in the test set, with reference to a baseline set of the potential candidate items (FIG. 4), and an activity 430 of determining substitutive probabilities for an evaluation set comprising candidate items for substitution for the target item by using the substitutive probability model, wherein the candidate items comprise at least one of the potential candidate items (FIG. 4)).

In many embodiments, item information database 380 can store computing instructions configured to run on one or more processing modules and perform one or more acts of method 400 (FIG. 4) (e.g. an activity of providing potential candidate items for a test and/or evaluation set of potential candidate items to the substitutive probability service system 370 (FIG. 4), an activity of storing one or more of a substitutive probability model and/or relative contributions of associations and/or image and/or feature similarities determined for a test set by the substitutive probability service system 370 (FIG. 4), an activity of providing item information such as item viewing information, item selecting information, item category information, item semantic information, item image information, and/or item description information to the substitutive probability service system 370 (FIG. 4), and an activity of providing one or more of a substitutive probability model and/or relative contributions of associations and/or image and/or feature similarities determined for a test set, to the substitutive probability service system 370 for use in determining substitutive probabilities for an evaluation set (FIG. 4)).

Although systems and methods for identifying substitute items have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system, comprising:
    one or more processors; and
    one or more non-transitory computer-readable media storing computing instructions configured to run on the one or more processors and perform:
        receiving a test set comprising potential candidate items for substitution for a target item;
        determining association scores for each of the potential candidate items in the test set;
        determining one or more semantic similarity features of the potential candidate items in the test set to the target item in relation to semantic data for the target item and the potential candidate items;
        determining one or more image similarity features of the potential candidate items in the test set to the target item in relation to a similarity of images of the potential candidate items to one or more images of the target item by evaluating image similarity using a convolutional neural network (CNN);
        creating a substitutive probability model by determining a relative contribution of each of the association scores, the one or more semantic similarity features and the one or more image similarity features to a substitutive probability for the potential candidate items in the test set, with reference to a baseline set of the potential candidate items; and
        determining substitutive probabilities for an evaluation set comprising candidate items for substitution for the target item by using the substitutive probability model, wherein the candidate items comprise at least one of the potential candidate items.

2. The system of claim 1, wherein receiving the test set comprises:
    receiving the potential candidate items that are identified as one or more of:
        (i) one or more potential candidate items that have been viewed during a same browsing session as the target item by a same viewer, for a minimum number of browsing sessions; and
        (ii) one or more of the potential candidate items belonging to a same category as the target item.

3. The system of claim 1, wherein the baseline set of the potential candidate items comprises one or more of the potential candidate items that are manually identified as a substitute for the target item.

4. The system of claim 1, wherein determining the association scores further comprises:
    determining a viewed-also-viewed association score of the association scores by evaluating a formula:

$P(VAV)\_ij$=(total number of browsing sessions in which item $i$ and item $j$ are both viewed)/(total number of browsing sessions in which item $i$ is viewed and item $j$ is not viewed), where item i represents the target item and item j represents a potential candidate item.

5. The system of claim 1, wherein determining the association scores further comprises:
    determining a selected-also-selected association score of the association scores by evaluating a formula:

$P(SAS)\_ij$=(total number of browsing sessions in which item $i$ and item $j$ are both selected)/(total number of browsing sessions in which item $i$ is selected and item $j$ is not selected), where item i represents the target item and item j represents a potential candidate item.

6. The system of claim 1, wherein determining the association scores further comprises:
    determining a viewed-ultimately-selected association score of the association scores by evaluating a formula:

$P(VUS)\_ij$=(total number of browsing sessions in which item $j$ is selected and item $i$ is viewed)/ (total number of browsing sessions in which an item is selected and item $i$ is viewed), where item i represents the target item and item j represents a potential candidate item.

7. The system of claim 1, wherein determining the one or more semantic similarity features of the potential candidate items in the test set to the target item comprises:
    determining at least one semantic similarity feature in relation to semantic data for the target item and at least one of the potential candidate items that includes at least one of an item title, an item description, or one or more item categories.

8. The system of claim 1, wherein determining the one or more semantic similarity features of the potential candidate items in the test set to the target item comprises:
    evaluating semantic similarity according to a Latent Dirichlet Allocation (LDA) topic model.

9. The system of claim 1, wherein creating the substitutive probability model by determining the relative contribution of each of the association scores, the one or more semantic similarity features and the one or more image similarity features to the substitutive probability for the potential candidate items in the test set, with reference to the baseline set of the potential candidate items, comprises:
    performing a logistic regression to determine substitutive probability Pij represented by formula:

$$P_{ij} = \frac{1}{1+e^{-(\beta_0+\sum_{k=1}^{n}\beta_k x_{ijk})}}$$

where
    the $x_{ijk}$'s each represent a viewed-also-viewed association score, a selected-also-selected score, a viewed-ultimately-selected score, the one or more semantic similarity features, and the one or more image similarity features, and
    the $\beta_k$'s each represent respective contributions of the viewed-also-viewed association score, the selectedalso-selected score, the viewed-ultimately-selected score, the one or more semantic similarity features, and the one or more image similarity features, as determined via logistic regression with reference to the baseline set of the potential candidate items.

10. The system of claim 1, wherein determining the substitutive probabilities comprises:
receiving the evaluation set of potential candidate items for substitution for the target item, the evaluation set comprising one or more of (a) potential candidate items in the test set and (b) non-test set potential candidate items that were not in the test set;
for any of the non-test set potential candidate items in the evaluation set that were not in the test set:
  determining non-test set association scores for each of the non-test set potential candidate items, the non-test set association scores comprising:
    (i) a viewed-also-viewed association score for each of the non-test set potential candidate items that is determined in relation to a total number of browsing sessions in which the target item and the non-test set potential candidate items were both viewed by a same viewer during a same browsing session;
    (ii) a selected-also-selected association score for each of the non-test set potential candidate items that is determined in relation to a total number of browsing sessions in which the target item and the non-test set potential candidate items were both selected by a same viewer during a same browsing session; and
    (iii) a viewed-ultimately-selected association score for each of the non-test set potential candidate items that is determined in relation to a total number of browsing sessions in which the target item was viewed and the non-test set potential candidate items were selected by a same viewer during a same browsing session;
  determining one or more semantic similarity features of the non-test set potential candidate items to the target item in relation to semantic data for the target item and the non-test set potential candidate items; and
  determining one or more image similarity features of the non-test set potential candidate items to the target item in relation to a similarity of images of the non-test set potential candidate items to one or more images of the target item by evaluating image similarity using a convolutional neural network (CNN); and
applying the substitutive probability model created using the test set of potential candidate items to evaluate the substitutive probabilities for one or more non-test set potential candidates of the evaluation set, using the association scores, the one or more semantic similarity features and the one or more image similarity features determined for non-test set potential candidate items in the evaluation set.

11. The system of claim 1, wherein the association scores further comprise:
  (i) a viewed-also-viewed association score for each of the potential candidate items in the test set that is determined in relation to a total number of browsing sessions in which the target item and one or more candidate items were both viewed by a same viewer during a same browsing session;
  (ii) a selected-also-selected association score for each of the potential candidate items in the test set that is determined in relation to a total number of browsing sessions in which the target item and the potential candidate items were both selected by a same viewer during a same browsing session; and
  (iii) a viewed-ultimately-selected association score for each of the potential candidate items in the test set that is determined in relation to a total number of browsing sessions in which the target item was viewed and the potential candidate items were selected by a same viewer during a same browsing session.

12. A method being implemented via execution of computing instructions configured to run at one or more processors and configured to be stored at non-transitory computer-readable media, the method comprising:
receiving a test set comprising potential candidate items for substitution for a target item;
determining association scores for each of the potential candidate items in the test set;
determining one or more semantic similarity features of the potential candidate items in the test set to the target item in relation to semantic data for the target item and the potential candidate items;
determining one or more image similarity features of the potential candidate items in the test set to the target item in relation to a similarity of images of the potential candidate items to one or more images of the target item by evaluating image similarity using a convolutional neural network (CNN);
creating a substitutive probability model by determining a relative contribution of each of the association scores, the one or more semantic similarity features and the one or more image similarity features to a substitutive probability for the potential candidate items in the test set, with reference to a baseline set of the potential candidate items; and
determining substitutive probabilities for an evaluation set comprising candidate items for substitution for the target item by using the substitutive probability model, wherein the candidate items comprise at least one of the potential candidate items.

13. The method of claim 12, wherein the baseline set of potential candidate items comprises one or more of the potential candidate items that are manually identified as substitutes for the target item.

14. The method of claim 12, wherein determining the association scores further comprises:
determining a viewed-also-viewed association score of the association scores by evaluating a formula:

$P(VAV)\_ij$=(total number of browsing sessions in which item $i$ and item $j$ are both viewed)/(total number of browsing sessions in which item $i$ is viewed and item $j$ is not viewed), where item i represents the target item and item j represents a potential candidate item, and
determining a selected-also-selected association score of the association scores comprises by evaluating a formula:

$P(SAS)\_ij$=(total number of browsing sessions in which item $i$ and item $j$ are both selected)/(total number of browsing sessions in which item $i$ is selected and item $j$ is not selected), where item i represents the target item and item j represents a potential candidate item, and
determining a viewed-ultimately-selected association score of the association scores by evaluating a formula:

$P(VUS)\_ij$=(total number of browsing sessions in which item $j$ is selected and item $i$ is viewed)/

(total number of browsing sessions in which an item is selected and item i is viewed), where item i represents the target item and item j represents a potential candidate item.

15. The method of claim 12, wherein determining the one or more semantic similarity features of the potential candidate items in the test set to the target item comprises:
   determining at least one of the one or more semantic similarity features in relation to the semantic data for the target item and at least one of the potential candidate items that includes at least one of an item title, an item description, or one or more item categories, and evaluating semantic similarity of the semantic data according to a Latent Dirichlet Allocation (LDA) topic model.

16. The method of claim 12, wherein creating the substitutive probability model by determining the relative contribution of each of the association scores, the one or more semantic similarity features and the one or more image similarity features to the substitutive probability for the potential candidate items in the test set, with reference to the baseline set of the potential candidate items, comprises:
   performing a logistic regression to determine substitutive probability $P_{ij}$ represented by formula:

$$P_{ij} = \frac{1}{1 + e^{-(\beta_0 + \sum_{k=1}^{n} \beta_k x_{ijk})}}$$

where
   the $x_{ijk}$'s each represent a viewed-also-viewed association score, a selected-also-selected score, a viewed-ultimately-selected score, the one or more semantic similarity features, and the one or more image similarity features, and
   the $\beta_k$'s each represent respective contributions of the viewed-also-viewed association score, the selected-also-selected score, the viewed-ultimately-selected score, the one or more semantic similarity features, and the one or more image similarity features, as determined via logistic regression with reference to the baseline set of the potential candidate items.

17. The method of claim 12, wherein determining the substitutive probabilities comprises:
   receiving the evaluation set of potential candidate items for substitution for the target item, the evaluation set comprising one or more of (a) potential candidate items in the test set and (b) non-test set potential candidate items that were not in the test set;
   for any of the non-test set potential candidate items in the evaluation set that were not in the test set:
      determining non-test set association scores for each of the non-test set potential candidate items, the non-test set association scores comprising:
         (i) a viewed-also-viewed association score for each of the non-test set potential candidate items that is determined in relation to a total number of browsing sessions in which the target item and the non-test set potential candidate items were both viewed by a same viewer during a same browsing session;
         (ii) a selected-also-selected association score for each of the non-test set potential candidate items that is determined in relation to a total number of browsing sessions in which the target item and the non-test set potential candidate items were both selected by a same viewer during a same browsing session; and
         (iii) a viewed-ultimately-selected association score for each of the non-test set potential candidate items that is determined in relation to a total number of browsing sessions in which the target item was viewed and the non-test set potential candidate items were selected by a same viewer during a same browsing session;
      determining one or more semantic similarity features of the non-test set potential candidate items to the target item in relation to semantic data for the target item and the non-test set potential candidate items; and
      determining one or more image similarity features of the non-test set potential candidate items to the target item in relation to a similarity of images of the non-test set potential candidate items to one or more images of the target item by evaluating image similarity using a convolutional neural network (CNN); and
   applying the substitutive probability model created using the test set of potential candidate items to evaluate the substitutive probabilities for one or more non-test set potential candidates of the evaluation set, using the association scores, the one or more semantic similarity features and the one or more image similarity features determined for non-test set potential candidate items in the evaluation set.

18. The method of claim 12, wherein the association scores further comprise:
   (i) a viewed-also-viewed association score for each of the potential candidate items that is determined in relation to a total number of browsing sessions in which the target item and the potential candidate items were both viewed by a same viewer during a same browsing session;
   (ii) a selected-also-selected association score for each of the potential candidate items that is determined in relation to a total number of browsing sessions in which the target item and the potential candidate items were both selected by a same viewer during a same browsing session; and
   (iii) a viewed-ultimately-selected association score for each of the potential candidate items that is determined in relation to a total number of browsing sessions in which the target item was viewed and the potential candidate items were selected by a same viewer during a same browsing session.

19. A method being implemented via execution of computing instructions configured to run at one or more processors and configured to be stored at non-transitory computer-readable media, the method comprising:
   receiving an evaluation set of potential candidate items for substitution for a target item, the evaluation set comprising one or more of potential candidate items in a test set and non-test set potential candidate items that were not in the test set;
   for any non-test set potential candidate items in the evaluation set that were not in the test set:
      determining non-test set association scores for each of the non-test set potential candidate items;
      determining one or more semantic similarity features of the non-test set potential candidate items to the target item in relation to semantic data for the target item and the non-test set potential candidate items; and determining one or more image similarity features of the non-test set potential candidate items to the target item in relation to a similarity of images of the non-test set potential candidate items to one or more images of the target item by evaluating image similarity using a convolutional neural network (CNN); and applying a substitutive probability model created using the test set of potential candidate items to evaluate substitutive probabilities for one or more non-test set potential candidates of the evaluation set, using the non-test set association scores, the one or more semantic similarity features and the one or more image similarity features determined for the one or more non-test set potential candidate items in the evaluation set.

20. The method of claim 19, wherein the substitutive probability model created using the test set of potential candidate items is created by:

receiving the test set comprising the potential candidate items for substitution for the target item; and determining association scores for each of the potential candidate items in the test set, the association scores comprising:
  (i) a viewed-also-viewed association score for each of the potential candidate items in the test set that is determined in relation to a total number of browsing sessions in which the target item and one or more candidate items were both viewed by a same viewer during a same browsing session; and
  (ii) a selected-also-selected association score for each of the potential candidate items in the test set that is determined in relation to a total number of browsing sessions in which the target item and the potential candidate items were both selected by a same viewer during a same browsing session; and
  (iii) a viewed-ultimately-selected association score for each of the potential candidate items in the test set that is determined in relation to a total number of browsing sessions in which the target item was viewed and the potential candidate items were selected by a same viewer during a same browsing session;

determining one or more semantic similarity features of the potential candidate items in the test set to the target item in relation to semantic data for the target item and the potential candidate items;

determining one or more image similarity features of the potential candidate items in the test set to the target item in relation to a similarity of images of the potential candidate items to one or more images of the target item by evaluating image similarity using a convolutional neural network (CNN);

creating a substitutive probability model by determining a relative contribution of each of the association scores, the one or more semantic similarity features and the one or more image similarity features to a substitutive probability for the potential candidate items in the test set, with reference to a baseline set of the potential candidate items; and determining substitutive probabilities for an evaluation set comprising candidate items for substitution for the target item by using the substitutive probability model, wherein the candidate items comprise at least one of the potential candidate items.

21. The method of claim 19, wherein the non-test set association scores further comprise:
  (i) a viewed-also-viewed association score for each of the non-test set potential candidate items that is determined in relation to a total number of browsing sessions in which the target item and the non-test set potential candidate items were both viewed by a same viewer during a same browsing session;
  (ii) a selected-also-selected association score for each of the non-test set potential candidate items that is determined in relation to a total number of browsing sessions in which the target item and the non-test set potential candidate items were both selected by a same viewer during a same browsing session; and
  (iii) a viewed-ultimately-selected association score for each of the non-test set potential candidate items that is determined in relation to a total number of browsing sessions in which the target item was viewed and the non-test set potential candidate items were selected by a same viewer during a same browsing session.

* * * * *